(12) United States Patent
Alexander et al.

(10) Patent No.: US 9,876,543 B2
(45) Date of Patent: Jan. 23, 2018

(54) SYSTEMS AND METHODS FOR CHANNEL STATE INFORMATION EXCHANGE

(71) Applicant: Ixia, Calabasas, CA (US)

(72) Inventors: Thomas Alexander, Mulino, OR (US); Lester Noel Stott, Aloha, OR (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 0 days.

(21) Appl. No.: 14/988,707

(22) Filed: Jan. 5, 2016

(65) Prior Publication Data

US 2017/0195016 A1 Jul. 6, 2017

(51) Int. Cl.
*H04L 1/16* (2006.01)
*H04B 7/0417* (2017.01)
*H04B 7/06* (2006.01)

(52) U.S. Cl.
CPC ......... *H04B 7/0417* (2013.01); *H04B 7/0626* (2013.01); *H04L 1/1664* (2013.01)

(58) Field of Classification Search
CPC ... H04L 5/0053; H04L 5/0055; H04L 1/1671; H04L 1/0026; H04L 1/0027; H04L 1/0073; H04L 5/0048; H04L 5/0057
USPC .................. 375/267; 370/280, 329
See application file for complete search history.

(56) References Cited

U.S. PATENT DOCUMENTS

| | | | |
|---|---|---|---|
| 2005/0259686 A1* | 11/2005 | Lewis | H04L 25/0226 370/469 |
| 2011/0299480 A1 | 12/2011 | Breit et al. | |
| 2012/0127899 A1 | 5/2012 | Ketchum et al. | |
| 2015/0146807 A1 | 5/2015 | Zhang et al. | |
| 2015/0270879 A1 | 9/2015 | Chen et al. | |
| 2015/0311968 A1 | 10/2015 | Seok | |

OTHER PUBLICATIONS

Paul et al., "Wireless LAN Comes of Age: Understanding the IEEE 802.11n Amendment," IEEE Circuits and Systems Magazine, Digital Object Identifier 10.1109/MCAS.2008.915504, pp. 28-54 (2008).
Notification of Transmittal of the International Search Report and the Written Opinion of the International Searching Authority, or the Declaration for International Application No. PCT/US2017/012309 (dated Apr. 25, 2017).

* cited by examiner

*Primary Examiner* — David S Huang
(74) *Attorney, Agent, or Firm* — Jenkins, Wilson, Taylor & Hunt, P.A.

(57) ABSTRACT

Systems and methods are disclosed herein to provide improved channel estimation and channel state information (CSI) transfer in a wireless data communication system, including but not limited to Multiple Input Multiple Output (MIMO) communication systems. In accordance with one or more embodiments and aspects thereof, a channel estimation and CSI transfer system is disclosed that extends and utilizes existing frame transfer elements to accomplish estimation and transfer. Such a system may offer improved capabilities such as a lower overhead CSI transfer, reduced data transfer latency, and more frequent CSI measurements.

20 Claims, 14 Drawing Sheets

SYSTEMS AND METHODS FOR CHANNEL STATE INFORMATION EXCHANGE

TECHNICAL FIELD

The subject matter described herein relates generally to wireless data communication systems; and more particularly to systems and methods for estimating the properties of multiple input multiple output (MIMO) radio frequency (RF) wireless channels and efficiently communicating these properties between wireless transmitters and receivers.

BACKGROUND

Modern wireless data communications systems can utilize the benefits of multiple transmit and receive antennas to improve both the range and data communications bandwidth. In particular, Multiple Input Multiple Output (MIMO) systems can utilize the spatio-temporal properties of the RF channel, particularly the fact that such RF channels may contain large numbers of reflective elements (scatterers), to transmit parallel but independent streams of data. This may greatly increase the amount of data that can be transferred from a transmitter to a receiver. The number of antennas available at the transmitter and the receiver, together with the number of individual propagation modes available in the RF channel due to the presence of scatterers, determines the number of parallel data streams that may be supported. With a sufficient number of available antennas, therefore, a MIMO transmitter may split a single stream of digital data into independent parallel streams and modulate each transmit antenna separately to transmit each parallel stream on a different propagation mode, which may be received independently by a multi-antenna MIMO receiver. MIMO systems are therefore seeing widespread use in high-speed wireless digital transmission systems.

With reference to FIG. 1, a block diagram of an exemplary MIMO RF wireless communication system is depicted in greatly simplified form. Such a system may comprise transmitter 1 and receiver 9. Transmitter 1 may accept a stream of digital transmit data 2, process it using digital modulator 2 (which may transform blocks of digital data to complex-valued digital modulation signals), and then feed the modulated signals to transmit MIMO encoder 3 to perform space-time processing followed by transmit precoder 5 for digital beamforming. Space-time processing and beamforming may split up a single transmit data stream 2 into M individual component streams that may be converted to the analog domain by digital-to-analog (D/A) converters 6 and transformed to RF signals by RF up-converters 7, before being transmitted on at least M transmit antennas 8.

MIMO receiver 9 may utilize at least N receive antennas 10 to receive N different copies of the transmitted signals and may pass these to RF down-converters 11, which may convert them to baseband for digitization by analog-to-digital (A/D) converters 12. Digitized signals may be processed by MIMO decoder and equalizer 13, which may remove the effects of the RF channel to recover the original space-time coded signal transmitted by transmitter 1 on antennas 8. The equalized signal may then be passed to space-time demapper and demodulator 14 for space-time decoding and conversion from modulated symbols to receive digital bitstream 15, which may be a regenerated version of the original transmit bitstream 2.

Signals generated by MIMO transmitter 1 may be transmitted over an RF channel having a channel transfer function matrix being represented as [H]. Matrix [H] may have at least as many rows as there are transmit antennas 8 (for example, M) and further may have at least as many columns as there are receive antennas 10 (for example, N), and each element of [H] may represent the complex transfer function between an individual pair of transmit and receive antennas. MIMO decoder and equalizer B may therefore need to be provided with an accurate measurement of the channel matrix [H] by channel estimator 16. These measurements may be performed on known signals transmitted by MIMO transmitter 1 for the express purpose of measuring channel matrix [H].

Transmit precoder 5 may improve the signal-to-noise ratio (SNR) of the transmitted signals at receiver 9 by performing a precoding operation on the transmitted signals. This precoding operation may utilize knowledge of the RF channel currently existing between MIMO transmitter 1 and MIMO receiver 9 to ensure that maximum RF energy is placed in propagation modes of channel matrix [H] that will yield the best transfer of energy from antennas 8 to antennas 10, while simultaneously minimizing energy placed into other propagation modes. In this manner, signal transfer from transmitter 1 to receiver 9 may be maximized (which may substantially improve the SNR), while simultaneously minimizing the signal transfer from transmitter 1 to other spatial locations, which may substantially decrease the interference level.

It is apparent that transmit precoder 5 may require an accurate knowledge of the RF channel existing between antennas 8 and antennas 10 in order to determine the available propagation modes and further determine which propagation modes to fill with RF energy. However, such an accurate knowledge of the RF channel may be available only to channel estimator 16 in MIMO receiver 9. Therefore, MIMO receiver 9 may employ some process for transferring RF channel measurements to MIMO transmitter 1 for use in transmit precoder 5, as indicated by logical path 15 in FIG. 1. These RF channel measurements may customarily be referred to as beamforming parameters, or as channel state information (CSI).

It is apparent that the estimation of channel state information and the transfer of calculated CSI from a MIMO receiver to a corresponding MIMO transmitter may be of significant consequence in a MIMO wireless communication system. FIG. 2 represents one such procedure for estimation and transfer of CSI, for instance as used in the IEEE 802.11 Wireless Local Area Network (WLAN) protocol. As shown, the process may begin with the transmission of a special frame 20 with a known data pattern, referred to as a sounding request or Null Data Packet (NDP), by a MIMO transmitter to a MIMO receiver. The latter may respond to the NDP with a standard acknowledgement (ACK) 21 after a Short Interframe Spacing (SIFS). The MIMO receiver may then use the known data pattern in NDP frame 20 to compute the channel matrix [H]. After some time period, which may be a DCF Interframe Spacing (DIFS), the MIMO receiver may respond to the MIMO transmitter with a beamforming parameter frame 22 containing CSI. The MIMO transmitter may respond in its turn with ACK 23, and then may further process and extract the CSI from frame 22 and may apply them to its transmit precoder. A subsequent data frame 24 transmitted by the MIMO transmitter may have the beamforming parameters applied, and consequently may experience a higher SNR and a lower probability of error. Data frame 24 may then be acknowledged with ACK frame 25 by the MIMO receiver.

A significant issue observed from the frame sequence depicted in FIG. 2 is that the CSI estimation and transfer procedure may consume a substantial amount of RF channel capacity. As seen in FIG. 2, the CSI estimation sequence requires the transmission of two measurement data frames and two acknowledgement frames in addition to the payload data frame 24 that carries useful data. Transmission of these extra frames consumes medium capacity that cannot be devoted to user data transfer, and therefore reduces the available data bandwidth. Further, the CSI estimation and transfer procedure may have to be performed separately between each MIMO transmitter/receiver pair, as the RF channel may be substantially different between different pairs. Yet further, in the case of bidirectional (simultaneous upstream and downstream data transfers) the CSI exchange may need to be performed twice, once in the upstream direction and once in the downstream direction. This obviously increases the level of overhead considerably.

A protocol diagram of an exemplary CSI estimation and transfer procedure may be depicted in FIG. 3. In FIG. 3, the activities of a MIMO transmitter proceed along line 30, while the activities of a counterpart MIMO receiver may proceed along line 31. At point 32, the MIMO transmitter may generate some fixed and well-known test data transmitted over the RF channel as sounding packet, NDP, or beamforming request frame 33. At point 34, the receiver may receive beamforming request frame 33 and calculates the CSI therefrom, after which at point 34 the MIMO receiver may transmit the coefficients of the CSI matrix (i.e., the [H] matrix) as a beamforming response or CSI frame 36. At point 37, the MIMO transmitter may receive the beamforming response frame and may extract the CSI coefficients from it, and then at step 38 it may set these coefficients in its transmit precoder. Finally, the MIMO transmitter may send precoded (beamformed) data 39, which may be successfully received by the MIMO receiver.

An issue that may be observed from the trellis diagram depicted in FIG. 3 is that the CSI estimation and transfer procedure may require a substantial amount of time to complete. As observed, the process requires a complete frame exchange to occur before any data transmissions can take place. The CSI estimation and transfer frame exchange therefore delays the start of the actual data transfer, introducing considerable latency into the user data path. In the possible event that multiple users are attempting to access the RF medium simultaneously, each user may need to perform the CSI estimation and transfer frame exchange separately, thereby further exacerbating the problem. In another situation, if a user communicating with an access point attempts to switch to a different access point (e.g., as a consequence of mobility), the need to perform these CSI frame exchanges may introduce considerable delay until data transfer can resume, which may adversely impact the rate at which a mobile station can switch between access points.

Yet another significant issue that may be brought out by FIG. 2 and FIG. 3 is the reduction in timeliness of the CSI that may be fed back to the MIMO transmitter by the MIMO receiver. As seen from FIG. 2, the MIMO receiver makes its measurements on NDP frame 20, but may then return the measured CSI information via a separate beamforming response frame 22. The IEEE 802.11 WLAN protocol, for example, requires that these separate frames be treated as separate accesses to the RF medium; if other stations are concurrently contending for use of the medium, there may be a considerable delay between NDP frame 20 and beamforming response frame 22. If the RF channel is changing rapidly, e.g., due to moving reflective objects present in it, then the information in beamforming response frame 22 may be out-of-date by the time the MIMO receiver is able to access the medium and transmit it. In this case, the MIMO transmitter will receive inaccurate CSI and may not be able to properly precode the transmitted signals.

The overhead imposed by the frame sequence depicted in FIG. 2 may also result in a reduced rate of channel sounding that may practicably be performed by the MIMO transmitter and MIMO receiver. If CSI estimation and transfer consumes significant RF channel capacity, and entails significant delays in data transmission, then it may not be possible to perform the CSI estimation process frequently. However, in situations where the RF channel is changing rapidly (e.g., when the MIMO transmitter or MIMO receiver or both are located on a moving vehicle, such as an automobile or train), this may render the system unable to provide the optimum data transfer rate, as the rate of channel estimation may not be sufficient to capture the state of the RF channel at all times.

There is hence a need for improved MIMO wireless channel estimation and CSI transfer systems and methods. A system that can reduce the channel capacity overhead incurred by the CSI transfer process may be desirable. It may be advantageous for systems to provide the CSI information more rapidly to reduce data transfer latency and enhance mobility. Such systems may preferably ensure that the CSI fed back from the MIMO receiver to the MIMO transmitter captures the channel statistics at a recent point in time. Finally, a system that enables the rate of channel sounding to be increased may be desirable, to allow a MIMO transmitter and receiver to cope with rapidly changing channel conditions.

SUMMARY

Systems and methods are disclosed herein that may provide improved techniques for estimating and exchanging information pertaining to the RF properties of MIMO wireless data communication channels, such as may exist between a MIMO transmitter and a MIMO receiver. Such techniques may enable the improved transfer of channel estimates and corresponding beamforming equalization matrices, and further may allow these channel estimates and equalization matrices to be transferred with lower latency and reduced overhead. The systems and methods disclosed may further improve the rapidity of channel estimation and the exchange of channel statistics, which may facilitate the ability to cope with rapidly changing channel conditions.

In accordance with one embodiment, a method of transferring channel estimates or beamforming equalization matrices between a MIMO transmitter and receiver is disclosed that may enable such estimates to be transferred as part of normal data or control frames. The method may comprise: identifying points in time where channel estimates need to be transferred; computing these channel estimates; locating an appropriate data or control frame that is intended to be transmitted to the recipient of these channel estimates; augmenting the data or control frame with these channel estimates; and explicitly or implicitly indicating that the data or control frame contains such an estimate.

In accordance with another embodiment, a system for transferring channel state information in the form of CSI or beamforming equalization matrices is disclosed, which may comprise: an RF reception datapath that receives and processes MIMO signals from a remote station; an RF channel estimator that calculates MIMO channel estimates and beamforming coefficients; a digital modulator, including a pilot subcarrier generator, that constructs a digitally encoded signal for transmission; and an RF transmitter datapath that processes MIMO signals for transmission to the remote station. Such an embodiment may accept channel state information and beamforming data from the channel estimator, and utilize portions of transmitted pilot subcarriers to transmit this data to a remote station.

In accordance with another embodiment, a system for transferring a channel estimate for wireless digital communications is provided. The system includes a channel estimator for receiving information over a wireless channel and generating a channel estimate. The system further includes a transmit processor for generating protocol information to be transmitted over said wireless channel. The system further includes a channel estimate piggyback communications module for piggybacking said channel estimate on said protocol information and transmitting said protocol information with said piggybacked channel estimate over said wireless channel.

In accordance with another embodiment, a method for transferring a channel estimate for wireless digital communications comprises receiving information over a wireless channel and generating a channel estimate. The method further includes generating information to be transmitted over said wireless channel. The method further includes piggybacking said channel estimate on said protocol information and transmitting said protocol information with said piggybacked channel estimate over said wireless channel.

Advantageously, channel estimates or equalization matrices may be transferred without incurring normal frame transmission overheads such as physical layer convergence protocol headers, inter-frame transmission gaps, or acknowledgements.

Advantageously, requests for updated channel estimates or equalization matrices may be triggered by utilizing existing control frame exchanges.

Advantageously, channel estimates or equalization matrices may be transferred by utilizing unused portions of pilot subcarriers within long data frames, thereby eliminating any extra overhead for transferring such information, and facilitating much more frequent exchanges of CSI without reducing the available capacity for data transfers.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The detailed description herein of the features and embodiments are best understood when taken in conjunction with the accompanying drawings, wherein.

DETAILED DESCRIPTION

Figure 4:
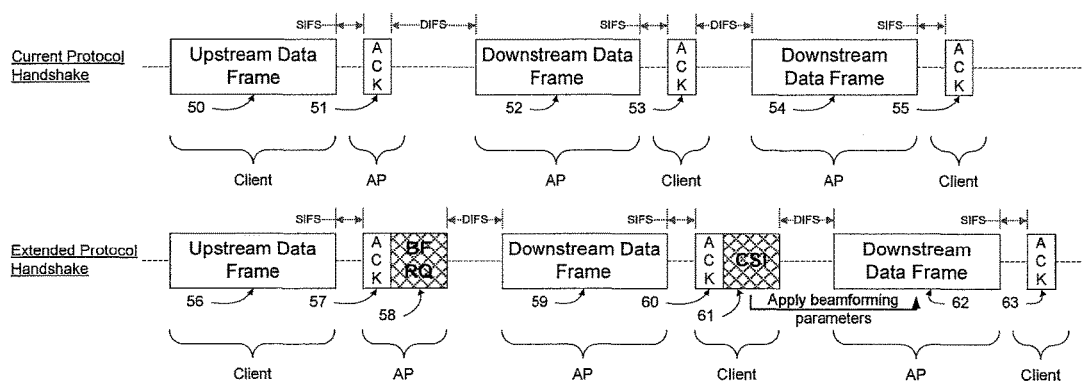
FIG. 4 illustrates the insertion of CSI into an acknowledgement frame that is returned in response to a data frame.

With reference to FIG. 4, a possible extension of an existing protocol handshake to transfer CSI is represented. An example of such a protocol handshake may be a data-acknowledgement handshake implemented in a wireless protocol such as the IEEE 802.11 protocol. An example of such a data-acknowledgement handshake (indicated as "current protocol handshake" in FIG. 4) known in the prior art may comprise an upstream data frame 50 transmitted by a wireless client to a wireless access point (AP), followed by an acknowledgement frame 51 of data frame 50 by the AP to the client. This handshake may be followed by a subsequent transmission of a downstream data frame 52 from the AP to the client, with a corresponding acknowledgement frame 53 returned by the client; and may yet further be followed by a second downstream data frame 54, with its corresponding acknowledgement frame 55.

In an embodiment, the current protocol handshake exemplified in FIG. 4 may be extended to transfer CSI with low overhead. In this representation, labeled "extended protocol handshake" in FIG. 4, it is assumed that a client again transmits upstream data frame 56 to an AP, which returns an acknowledgment frame 57 in response. However, the AP may then insert beamforming request block 58 as part of acknowledgement frame 57; the beamforming request block may indicate that it requires the client to provide CSI at the next available transmit opportunity. Subsequently, the AP may transmit a downstream data frame 59 to the client, to which the client may be expected to respond with an acknowledgement frame 60; however, as this represents a transmit opportunity for the client, it may insert CSI parameters 61 into acknowledgement frame 60. The AP may then extract the CSI, calculate beamforming parameters, and apply these parameters to a subsequent downstream data frame 62 that it may transmit to the client. To complete the handshake, the client may respond with acknowledgement frame 63.

Figure 1:
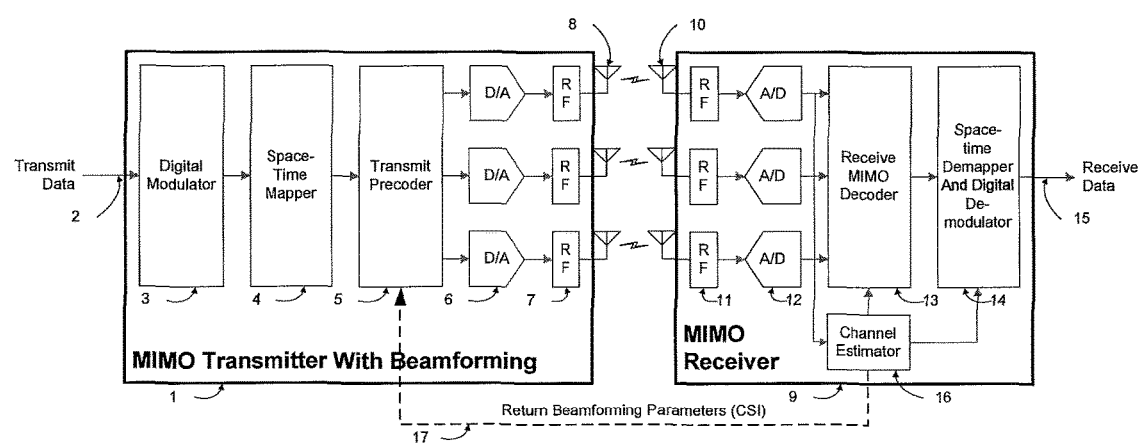
FIG. 1 shows a simplified representation of a MIMO transmitter and MIMO receiver, illustrating beamforming parameters being returned to the MIMO transmitter for beamforming.
Figure 2:
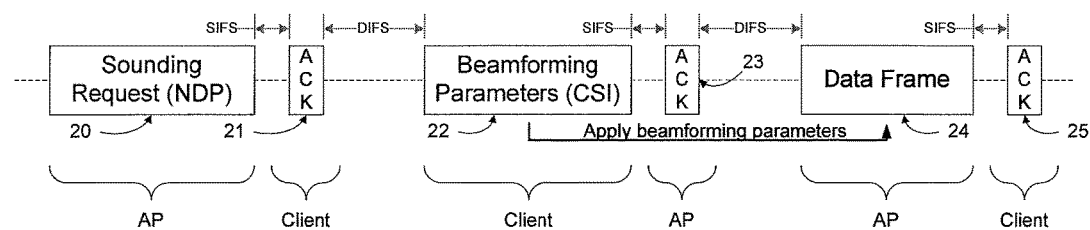
FIG. 2 represents an exemplary packet-level view of a beamforming exchange, comprising a sounding request followed by a CSI frame.
Figure 3:
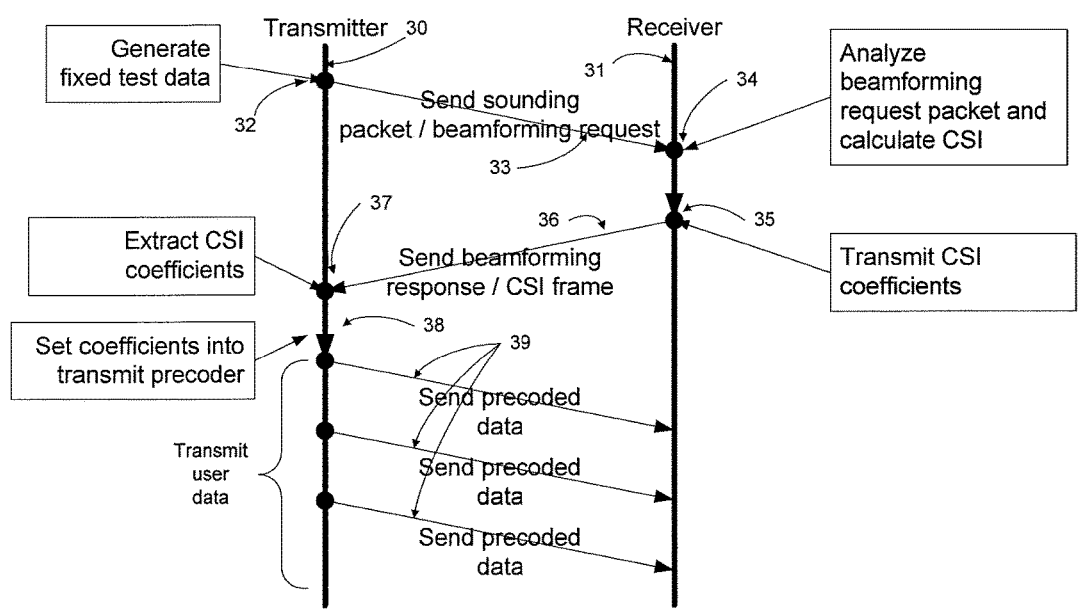
FIG. 3 depicts a protocol trellis diagram of a beamforming exchange followed by precoded data transmissions.

When compared to the dedicated beamforming exchange shown in FIG. 2, it is apparent that the utilization of an existing protocol handshake sequence in this manner may result in significant reduction in the overhead required to request and transfer CSI. The extra overhead of transmitting special frames with their corresponding acknowledgements and inter-frame spacing (all of which may consume significant RF medium capacity) may be completely avoided. In addition, the rate at which beamforming exchanges can take place substantially increases, particularly in situations where a large number of data frames are being exchanged. This may be especially beneficial because situations involving many data frames being transferred for long periods may also be correspondent with situations where beamforming exchanges should be performed more frequently, in order to cope with changing RF channel conditions.

Figure 5:
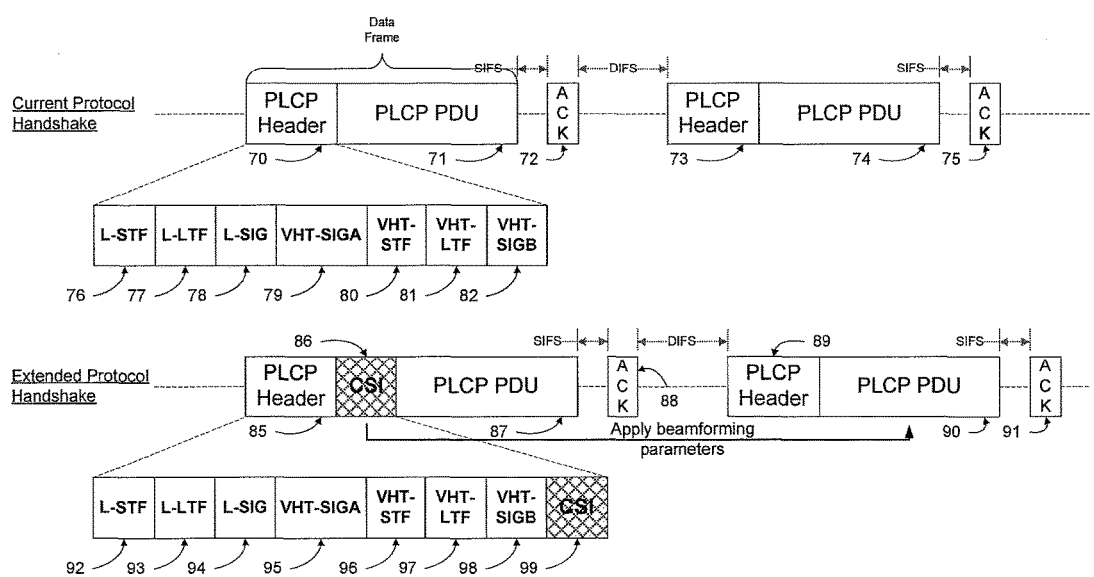
FIG. 5 provides an exemplary depiction of CSI being added as a component of the physical layer convergence protocol header transmitted as part of a data frame.

Turning now to FIG. 5, an aspect of an embodiment is depicted which may enable an improved transfer of CSI. In certain situations, it may be less advantageous to place CSI within a control frame such as acknowledgement frame 60 in FIG. 4, particularly where the amount of data required for the CSI is large. In such cases it may be desirable to transfer CSI as part of a data frame, since data frames are normally much larger than control frames and the additional overhead of including CSI is proportionally much lower.

FIG. 5 shows one method of extending a data frame with CSI parameters in response to a beamforming request received from a remote station. A possible current protocol handshake may comprise a data frame transmitted from a client to an AP, the data frame consisting of a physical layer convergence protocol (PLCP) header 70 and PLCP protocol data unit (PDU) 71. The AP may respond normally with an acknowledgement frame 72. Subsequently, the AP may transmit a data frame (again comprising PLCP header 73 and PLCP PDU 74) to the client, which may respond with acknowledgement 75. PLCP header 70 may comprise sub-elements such as legacy short training field (L-STF) 76, legacy long training field (L-LTF) 77, legacy signal field (L-SIG) 78, very high throughput (VHT) SIG A field (VHT-SIGA) 79, VHT-STF 80, VHT-LTF 81, and VHT SIG B field (VHT-SIGB) 82. Such a PLCP header may be found, for example, in Multiple Input Multiple Output (MIMO) and Multi-User MIMO (MU-MIMO) wireless protocols such as IEEE 802.11.

An extension of such a handshake that may be used to transport CSI parameters is represented in FIG. 5 and labeled as "extended protocol handshake". In this situation, it is assumed that a beamforming request may have been received at a prior point, and channel parameters may have been computed and stored in preparation for transfer. A data frame comprising PLCP header 85 and PLCP PDU 87 may again be transmitted from a client to an AP, but CSI parameters 86 may now be inserted into PLCP header 85 prior to transmission. As shown in the expanded view, new PLCP header 85 may comprise L-STF 92, L-LTF 93, L-SIG 94, VHT-SIGA 95, VHT-STF 96, VHT-LTF 97 and VHT-SIGB 98 as before, but further include CSI parameter block 99. The AP may respond to this data frame with acknowledgement 88 as normal, but may then extract CSI parameter block 99 and utilize the parameters therein to compute beamforming parameters, which may then applied to a subsequent data frame that may be transmitted by the AP to the client. This subsequent data frame may comprise PLCP header 89 and PLCP PDU 90, and the client may respond with acknowledgment 91.

Considering FIG. 5, it is apparent that the client may respond to a beamforming request, such as beamforming request 58 placed in acknowledgment frame 57 in FIG. 4, by returning CSI in a standard data frame. This may avoid the need to unduly extend relatively short acknowledgement frames, such as acknowledgement frame 60 in FIG. 4, in order to pass a large number of RF channel parameters between a client and an AP. It will be appreciated that such an approach may be utilized in different elements of a wireless protocol such as the IEEE 802.11 protocol.

In some wireless data transfers, such as data transfers that may be used when channel conditions are relatively poor, a request/response handshake may precede the data transfer. The request/response handshake may be used to notify the peer station that a data transfer is pending and may further be used by the peer station to signal that it is ready to accept the data transfer. An example of such a request/response handshake may be a Request To Send/Clear To Send (RTS/CTS) handshake that may be used in protocols such as IEEE 802.11. This is exemplified in FIG. 6, where RTS frame 110 may be transmitted by an AP to a client when downstream data transfer is to be performed, and the client may respond with CTS frame 111 indicating that it is ready and able to accept the transfer. Subsequently, the AP may transmit data frame 112 to the client and receive acknowledgement 113 in response. Once the AP has successfully established data transfers, it may transmit a succeeding data frame 114 to the client and receive acknowledgement 115 in response.

Figure 6:
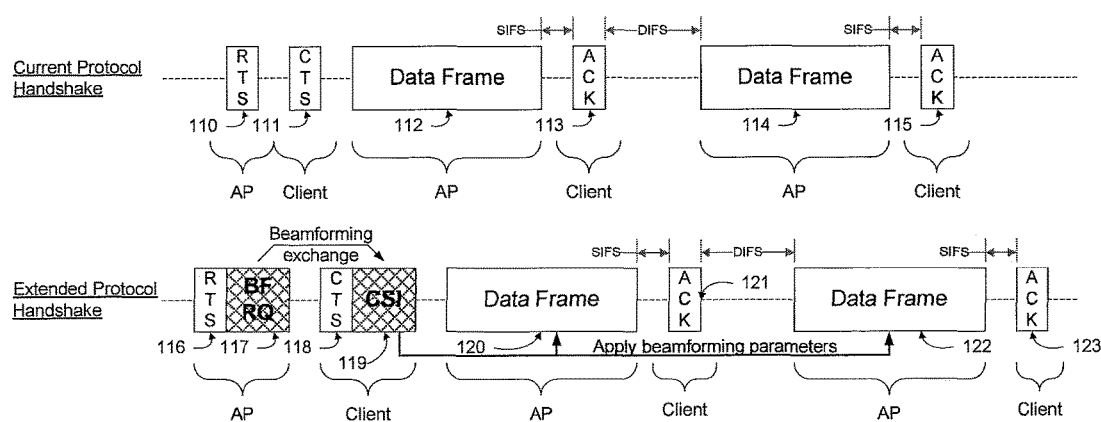
FIG. 6 shows a beamforming request being transmitted as part of a request-to-send frame and the corresponding CSI being returned as part of a clear-to-send frame.

In an aspect of an embodiment, it may be possible to extend such a request/response handshake to include a beamforming exchange, for example as seen in FIG. 6. Here an RTS frame 116 transmitted by an AP may further include a beamforming request 117, and the corresponding CTS frame 118 may further include a CSI block 119. The CSI from 119 may be extracted by the AP and used to calculate beamforming parameters, which may then be applied to the immediately following downstream data frame 120 (which receives acknowledgement 121) as well as a subsequent data frame 122 (which receives acknowledgement 123).

It may be particularly advantageous to couple a beamforming exchange with an RTS/CTS exchange in this manner because an RTS/CTS exchange may typically be used when channel conditions are relatively poor or congested, and hence an improved channel estimate may be beneficial in ensuring the maximum signal to noise ratio (SNR) for the subsequent data frame. Further, as may be observed from FIG. 6, the calculated parameters in CSI block 119 are very recent relative to data frame 120, and hence likely to be much more accurate than a separate independent beamforming exchange that may have been performed much earlier. Finally, the content of an RTS frame may be well-known and hence suitable for channel sounding purposes, in the same manner as the null data packet (NDP) sounding packet depicted in FIG. 2. Also, the extension of the RTS/CTS handshake to also perform channel sounding and beamforming exchanges significantly reduces the overhead associated with standard beamforming exchanges such as that shown in FIG. 2.

Figure 7:
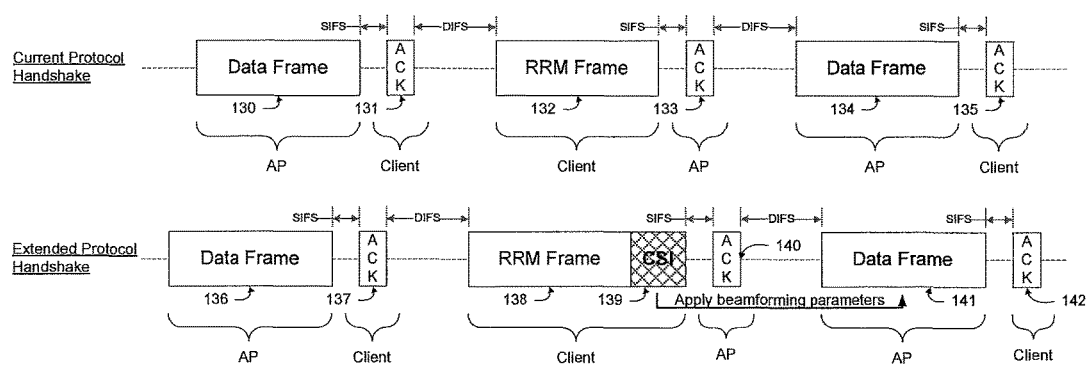
FIG. 7 depicts a possible transmission of CSI as part of a radio resource management frame used to notify a MIMO AP of the radio conditions as seen by a MIMO client.

Turning now to FIG. 7, a periodically conducted Radio Resource Management (RRM) protocol exchange is illustratively depicted, labeled "current protocol handshake". RRM may be used for radio neighborhood measurement and reporting purposes; for example a client may monitor the strength and SNR of the signal received from the AP as well as from surrounding wireless devices (e.g., other clients and APs) and may report this information back to the AP at regularly scheduled intervals using special RRM frames inserted between normal data frames. As seen in FIG. 7, the AP may transmit data frames 130 and 134 to the client (which are acknowledged at 131 and 135); in between these data frames, the client may transmit an RRM frame 132 containing neighborhood measurement reports to the AP, which may be acknowledged at 133.

As seen from FIG. 7, an RRM frame may be extended to further supply CSI for beamforming purposes. In this situation, the AP may transmit data frames 136 and 141, and the client may respond with acknowledgement frames 137 and 142. As before, the client may transmit an RRM frame 138 to the AP and receive an acknowledgement for this frame at 140. However, the client may include CSI block 139 containing RF channel estimates in RRM frame 138. The AP may then extract the channel parameters from CSI block 139, calculate beamforming estimates, and apply them to improve the SNR of subsequently transmitted data frames, such as frame 141.

RRM frames may be transmitted at regular intervals from clients to APs; a single measurement request transmitted from the AP to the client may trigger a series of measurement reports (RRM frames) in response. It may therefore be possible to facilitate the periodic measurement and reporting of CSI by the client to the AP without incurring the overhead of periodic beamforming exchanges. Instead, the AP may issue a single measurement request to the client, and receive not only periodic reports of neighboring APs and clients but also of CSI. Hence it may be possible for an AP to constantly refine its beamforming parameters and ensure the best possible SNR at a client even under rapidly changing channel conditions, without a significant loss of channel capacity resulting from standard beamforming exchanges.

Another area where updated channel state information may be desirable is in the case of power-save mode clients. In power-save mode, battery-powered wireless clients may elect to conserve their available battery capacity by only transmitting and receiving frames at widely spaced intervals. These clients may therefore shut off their radios and internal processing functions and enter a power-save (sleep) mode to save power during the times that they are not expected to perform data transfer. When the sleep interval is over and a client needs to transmit and receive any pending data, it may reactivate its radios and processing functions; it may then re-enter power-save mode after pending data has been dealt with. This may result in significant improvement in battery life.

In protocols such as IEEE 802.11, the AP may buffer downstream frames destined for the client, and only transfer these frames after it is aware that the client has left power-save mode and is ready to perform data transfers. This may be done to reduce the likelihood of frame loss to a client in power-save mode. To facilitate such operation, the client may notify the AP of its power-save state by means of trigger frames; further, the AP may also notify the client of pending downstream frames through its broadcast beacon frames. The power-save client may briefly awaken to receive the AP beacons, and return immediately to power-save (sleep) mode if no pending downstream frames are available to be transferred. This may simplify the power-save protocol and improve its efficiency.

Figure 8:
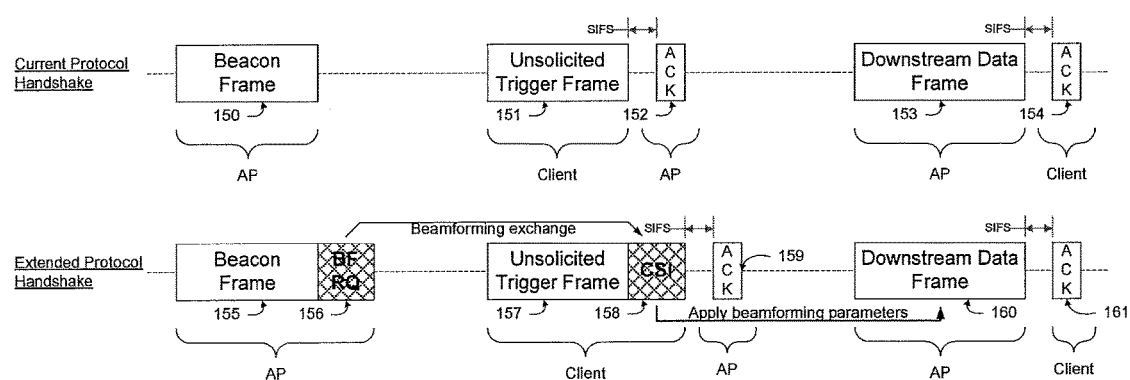
FIG. 8 represents an exemplary beamforming exchange where a sounding request is transmitted within an AP beacon frame and CSI is returned by a client in a power-save control frame.

With reference to FIG. 8, a typical example of a power-save mode protocol sequence, as known in the art, is shown. In this illustrative example, the AP may broadcast a beacon frame 150, that may include information including a notification to a power-save (sleeping) client that downstream data are available for download. The power-save client may awaken in time to receive beacon 150, determine that pending frames are ready, and may then transmit a trigger frame, such as an IEEE 802.11 Unsolicited Trigger Frame 151 to the AP (which is acknowledged by the AP at 152) to trigger the transmission of the downstream data. The AP may determine from trigger frame 151 that the client is awake and ready to receive, and may subsequently transmit downstream data frame 153 to the client, which may respond with acknowledgement frame 154. It should be noted that trigger frame 151 may also be an IEEE 802.11 Power-Save Poll (PS-Poll) frame, depending on which type of power-save protocol is being implemented.

A possible significant issue when performing a power-save transfer is that the client may not be able to provide an accurate and updated channel estimate to the AP prior to the data transfer, as periodically awakening to measure channel characteristics and report CSI to the AP may result in significant expenditure of battery life. This may become especially problematic in the case of a client that sleeps for long periods of time, for instance when entering extreme power-save modes. In this case the RF channel may have changed significantly since the last point at which the client was awake, and the CSI available to the AP may be inaccurate or completely out of date. This may result in a significant reduction of SNR for downstream data frames transmitted to the client, with a concomitant increase in the frame error rate and the number of retransmitted frames. All of these may militate against the objective of power-save mode, which is to save battery life.

An illustrative example of an extended protocol handshake that may address these problems is represented in FIG. 8. In this case, the AP may broadcast a beacon 155 which not only contains a notification to a client that pending downstream data are available, but may also include a beamforming request 156 directed to the same client. The client may then utilize the well-known data patterns in beacon 155, in conjunction with beamforming request 156, to compute the channel parameters. These channel parameters may be returned to the AP as CSI block 158 within trigger frame 157. After the AP acknowledges trigger frame 157 with acknowledgement frame 159, it may utilize the data in CSI block 158 to calculate beamforming parameters for the subsequent data frame or frames. The AP may then be enabled to apply these beamforming parameters to downstream data frame 160 transmitted to the client, which may successfully receive this frame and respond with acknowledgement 161.

The recalculation of beamforming parameters as a part of the power-save protocol may result in a substantial improvement in efficiency. The need for a separate beamforming exchange and the concomitant channel overhead and delays may be avoided. The AP may be furnished with accurate channel estimates prior to its first data transmission, which may avert the loss of data transmissions due to poor SNR. Finally, the number of frames exchanged as well as the duration of time for which the client must stay awake in order to exchange these frames is greatly reduced, particularly as the beamforming exchange may be combined with frame exchange sequences that may already be required as part of a power-save protocol. This may substantially improve battery capacity.

Figure 9:
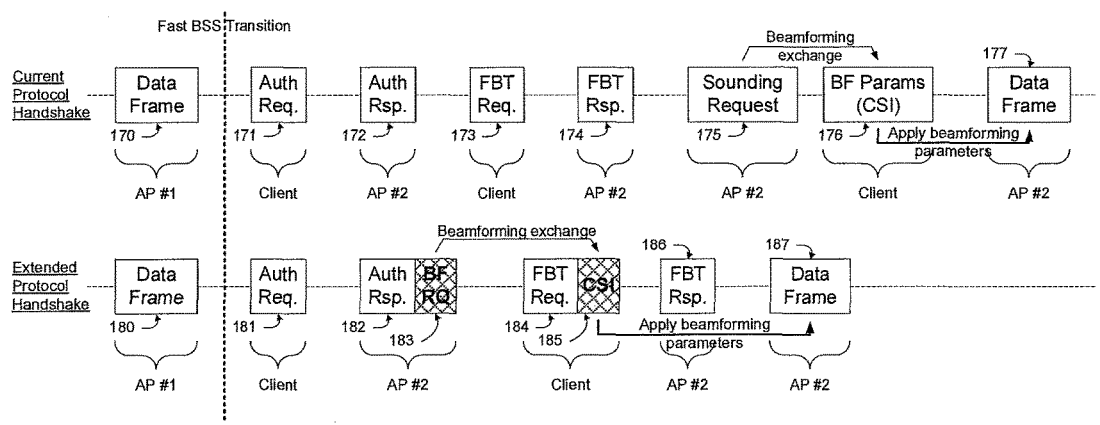
FIG. 9 illustrates a possible transmission of a sounding request and corresponding CSI as part of a client fast BSS transition protocol handshake.

Turning now to FIG. 9, an illustrative depiction of an aspect of an embodiment is shown, that may be applied to handover of a client from one AP to another AP, particularly a rapid handover such as the Fast BSS Transition (FBT) employed by protocols such as IEEE 802.11. (Note that for reasons of clarity the acknowledgement frames that normally succeed data or management frames are not shown; it should be taken as understood that each successfully transferred data or management frame will be followed by an acknowledgement in the opposite direction.) In the current form of such a handover, the first AP (represented as AP #1) may for example transmit a data frame 170 to the client. Subsequently the client may decide to perform a FBT to a second AP (represented as AP #2). After such a decision has been taken, the client may transmit authentication request 171 to AP #2, which may respond at some time thereafter with authentication response 172. The client may then issue a FBT request 173, and, if the FBT can be supported, AP #2 may return FBT response 174 which may indicate that the BSS transition has been successful, the client is associated with AP #2, and data transfer may proceed.

Prior to beginning data transfer, however, AP #2 may require an accurate estimate of the channel in order to update its beamforming parameters and maximize the SNR to the newly associated client. This may be performed with a beamforming exchange comprising sounding request 175 from AP #2 to the client, to which the client may respond with beamforming parameters (CSI) frame 176, containing the channel estimates and/or beamforming parameters. AP #2 may then calculate and apply suitable beamforming parameters to its transmitted data to the client in data frame 177.

An improved form of Fast BSS Transition may be depicted in the extended protocol handshake represented in FIG. 9. Such an improved FBT may proceed as follows. Initially, AP #1 may for instance transmit data frame 180 to the client, after which the client may take an FBT decision, and transmit authentication frame 181 to AP #2. AP #2 may then determine that it does not possess CSI for this new client, and may return an authentication response 182 containing a beamforming request block 183. Beamforming request block 183 may instruct the client to perform a channel estimation, potentially on well-known fixed elements of either authentication response 182 or beamforming request block 183 (or both), and return CSI to the AP. Subsequently the client may transmit FBT request 184, which may further contain CSI block 185 providing channel estimation/beamforming parameters to AP #2 in accordance with beamforming request block 183. AP #2 may respond with FBT response 186 indicating that the BSS transition has succeeded and the client is associated. AP #2 may then subsequently transmit a downstream data frame 187 to the client using the provided CSI.

It is apparent that such an improved FBT may provide several advantages. The AP possesses CSI with respect to the RF channel between itself and the client earlier and is therefore enabled to begin transmitting data to the client sooner. Further, the need for a separate beamforming exchange may be avoided, thereby reducing the channel congestion. The total duration of the Fast BSS Transition may be greatly reduced by the avoidance of the separate beamforming exchange, which may substantially reduce the time taken for a client to roam from one AP to another. This may be of particular importance in highly mobile scenarios such as clients on automobiles or trains, where FBT must be performed very rapidly in order to avoid interrupting data transfer. Finally, the availability of CSI for the RF path prior to the acceptance of the connection from the client by AP #2 permits the AP to determine whether the BSS transition is in fact desirable and supportable. For example, AP #2 may determine from the CSI that it is unable to sustain the level of data transfer that may be required by the client, and may elect to return an FBT response that specifically disallows the association as a consequence. This is not possible in the current protocol handshake, where the CSI is only known to AP #2 after the association has been accepted.

Figure 10:
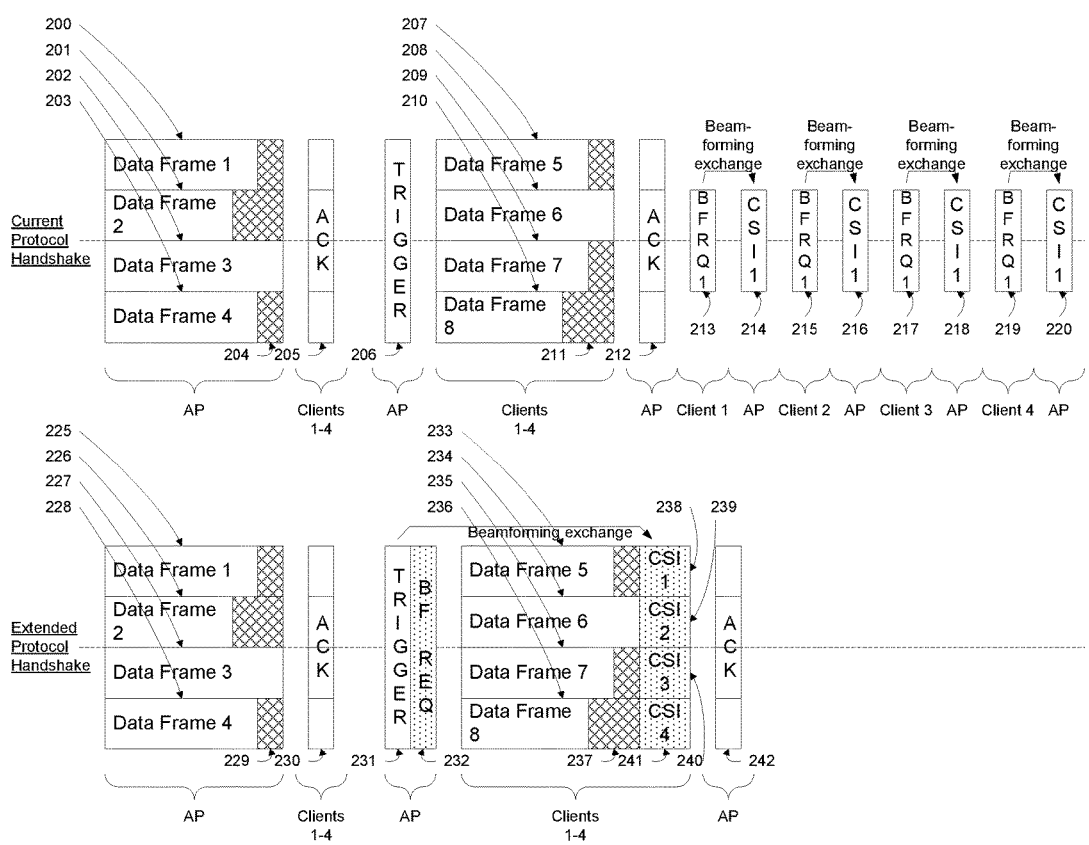
FIG. 10 shows an illustrative beamforming exchange utilizing an MU-MIMO trigger frame and the corresponding data frames returned by MU-MIMO clients.

FIG. 10 represents an aspect of an embodiment that may be applicable to more efficient channel sounding procedures for MU-MIMO systems. Channel sounding may be of particular importance for MU-MIMO as accurate and up-to-date estimates of the RF channel between the AP and all of its clients may be essential for permitting the AP to properly schedule client transmissions, maximize the SNR of different concurrently transmitted frames at different clients, and correctly trigger multiple clients to transmit their upstream frames. An exemplary MU-MIMO upstream and downstream data transfer, here involving four clients and one AP, may proceed as indicated by the current protocol handshake of FIG. 10. As shown, the AP may concurrently transfer data frames 200, 201, 202, 203 to four separate clients in one MU-MIMO burst, padding out these frames to an equal length using padding 204. After the frames have been transmitted, the four clients may return one or more acknowledgements 205. Subsequent to this, the AP may trigger the clients to transmit their upstream frames, using trigger frame 206 to synchronize the clients as well as controlling the specific clients that are enabled to transmit and possibly providing necessary beamforming parameters. The clients may respond to trigger frame 206 by concurrently transmitting data frames 207, 208, 209, 210 to the AP, again padding out the data frames using padding 211. The AP may return a composite acknowledgement 212 to the clients in response.

As noted, determination of the RF properties of the channel existing between the AP and the clients may be essential for error-free transmission of data, in both the upstream and the downstream direction. The AP may therefore perform a series of beamforming exchanges to each of the clients. This may be as indicated by beamforming requests 213, 215, 217 and 219 issued by the AP to each of the clients, followed by CSI (beamforming parameters) responses 214, 216, 218, 220. The CSI calculated by each client and conveyed to the AP by each beamforming exchange may then be processed by the AP and used for beamforming subsequent downstream frames, as well as being passed to clients in trigger frames to facilitate upstream transmissions.

It is apparent that the multiplicity of beamforming exchanges required in an MU-MIMO scenario may lead to a substantial amount of overhead, resulting in a net loss of efficiency and channel capacity. This is particularly applicable when high-data-rate modulations are applied to the data frames; the beamforming requests and responses may occupy a considerable fraction of the medium relative to the data frames themselves, as the frame overhead such as the PLCP header and interframe spacing may actually predominate over the time taken to transfer the data itself. This may become significant as the number of clients being served by the AP increases, because the AP may need to frequently perform beamforming exchanges with all of the clients in turn in order to keep its RF channel estimates updated. This may in turn lead to a reduction in the number of clients that an AP can feasibly support.

An improved beamforming exchange process that may be suitable for MU-MIMO is exemplified in the extended protocol handshake portion of FIG. 10. In this example, the AP may again concurrently transfer data frames 225, 226, 227 and 228 to four different clients using MU-MIMO techniques, inserting padding 229, after which the clients may respond with acknowledgments 230. The AP may then issue trigger frame 231 signaling the clients to transmit upstream data, and synchronizing them to start at the same instant; however, the AP may also include beamforming request block 232 within trigger frame 231 to signal the clients to make channel measurements and return them to the AP. The four clients thus triggered may use the fixed and well-known parameters in either trigger frame 231 or beamforming request block 232 (or both) to estimate the RF channel and/or compute beamforming parameters. Subsequently, the four triggered clients may transmit data frames 233, 234, 235, 236 to the AP using MU-MIMO techniques, padding them out with padding 237. After the padding is inserted, the four clients may return their separate CSI/beamforming parameters as CSI blocks 238, 239, 240, 241 appended to the padded data frames 233, 234, 235, 236. The AP may respond with acknowledgement 242, and may then extract and process the CSI/beamforming parameters from 238, 239, 240, 241 to update its estimates of the RF channels between itself and the clients. A subsequent downstream data frame, or a trigger frame initiating upstream transfer, may utilize these estimates for an improved SNR.

From FIG. 10 it is clear that the improved protocol handshake considerably reduces the amount of overhead incurred by the beamforming exchanges, and may eliminate the separate exchanges altogether in favor of transferring them as part of normal MU-MIMO exchanges. This may significantly reduce the amount of overhead incurred as well as freeing up more of the available channel capacity for payload-carrying data frames. In addition, it may improve the accuracy and timeliness of CSI maintained by the AP, because the reduced overhead may permit the AP to initiate beamforming exchanges much more frequently without considerable loss of capacity.

In modern MIMO wireless frame formats involving Orthogonal Frequency Division Multiplexing (OFDM) it may be usual to insert pilot symbols or subcarriers into OFDM data frames to facilitate clock recovery and synchronization, as well as to perform channel condition assessment on a continuous basis. For example the IEEE 802.11 protocol may dedicate several subcarriers in each data frame entirely to carrying pilot data, so that an OFDM receiver may be enabled to perform clock synchronization and channel assessment across the width of the occupied RF bandwidth. This may become particularly significant when the occupied bandwidth becomes large, as for instance 80 MHz or 160 MHz bandwidths.

It may not, however, be necessary to utilize the entire set of symbols transmitted on the pilot subcarriers for clock synchronization and channel assessment. In other wireless protocols such as LTE, for example, pilot symbols are used rather than dedicating entire subcarriers to pilot purposes; these pilot symbols are distributed uniformly across the duration of the frame but considerable time gaps exist between successive symbols. It may be possible to achieve satisfactory synchronization and assessment if the pilot subcarriers are sampled periodically, rather than continuously. In this case, the unused portions of the pilot subcarriers may be used to transfer channel-related data, such as CSI.

Figure 11:
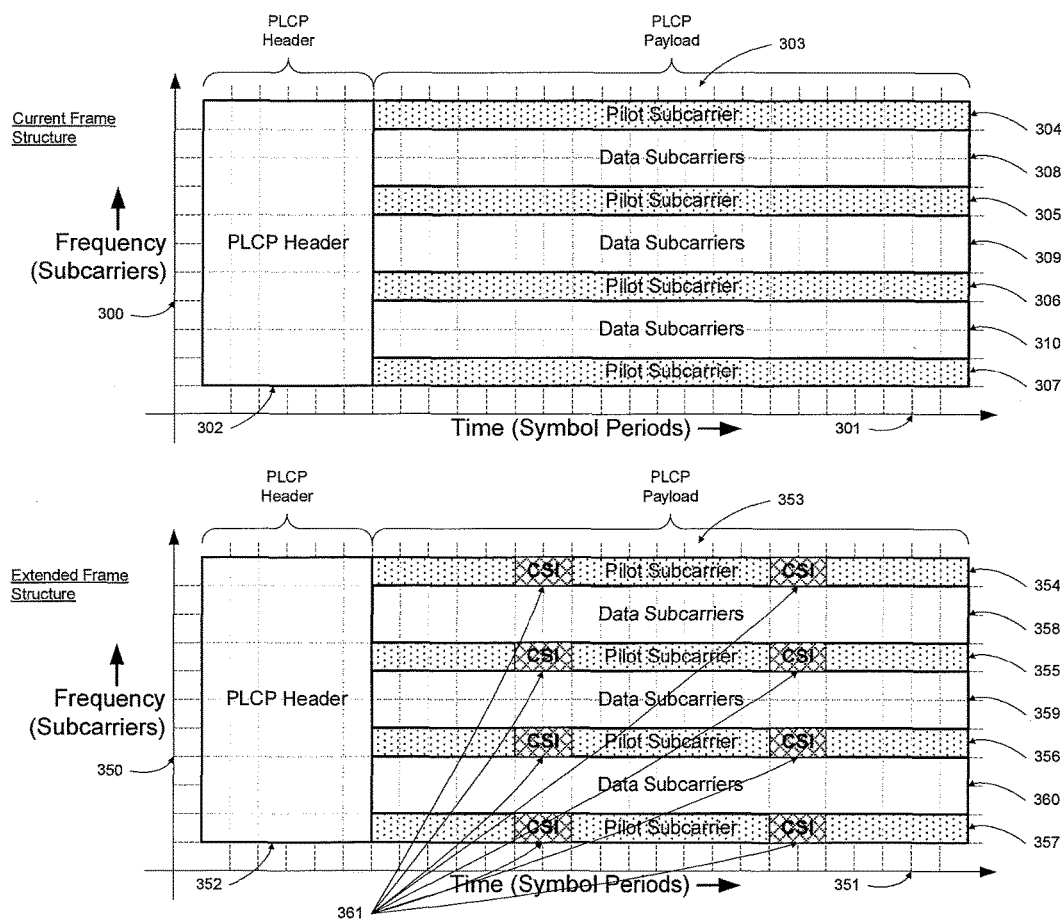
FIG. 11 depicts an exemplary system for generating channel estimates or beamforming parameters and returning them within pilot subcarriers of transmitted signals.

Turning now to FIG. 11, an aspect of an embodiment is exemplified where CSI may be transferred in unused portions of pilot subcarriers. A representation of an OFDM frame is depicted in the portion of the figure marked as "current frame structure", with the subcarriers represented along Y axis 300 and the time in symbol periods along X axis 301. The transmitted OFDM frame may comprise PLCP header 302 followed by the PLCP payload 303 carrying frame data. The PLCP payload may consist of blocks of data subcarriers 308, 309, 310 together with pilot subcarriers 304, 305, 306, 307. These pilot subcarriers may contain well-known and fixed information that may allow the OFDM receiver to align its subcarrier clock signal with that of the transmitter (i.e., perform clock frequency offset correction) as well as to perform channel estimation and assessment. The pilot subcarriers 304, 305, 306 and 307 may span the full width of the PLCP payload, even though clock frequency offset correction and channel estimation/assessment may need to be performed only at periodic intervals along PLCP payload 303.

The portion of the figure marked as "extended frame structure" may depict a possible approach to utilizing some of the unused pilot subcarrier space for CSI transfer. Again, subcarriers and symbols are represented along Y axis 350 and X axis 351, with PLCP header 352 and PLCP payload 353 comprising the OFDM frame. Data subcarrier blocks 358, 359, 360 carry payload data, while pilot subcarriers 354, 355, 356 and 357 are inserted during modulation. However, at periodic intervals, selected symbols 361 within the pilot subcarriers 354, 355, 356, 357 may be substituted with symbols encoded using the standard modulation formats to carry CSI. This CSI may have been previously calculated by the receiver based on a sounding packet or sounding data block, using any of the methods described herein.

Transmission of the CSI in this manner may be beneficial, as the overhead of dedicating multiple separate symbols to the CSI (whether as a separate frame, or as a block within an existing frame) is avoided. In addition, many more symbol periods are available in this manner to carry CSI, particularly in long frames where the duration of PLCP payload 353 may occupy many hundreds of symbols, and therefore a substantial increase in the accuracy and detail of the channel estimate may be achieved.

Figure 12:
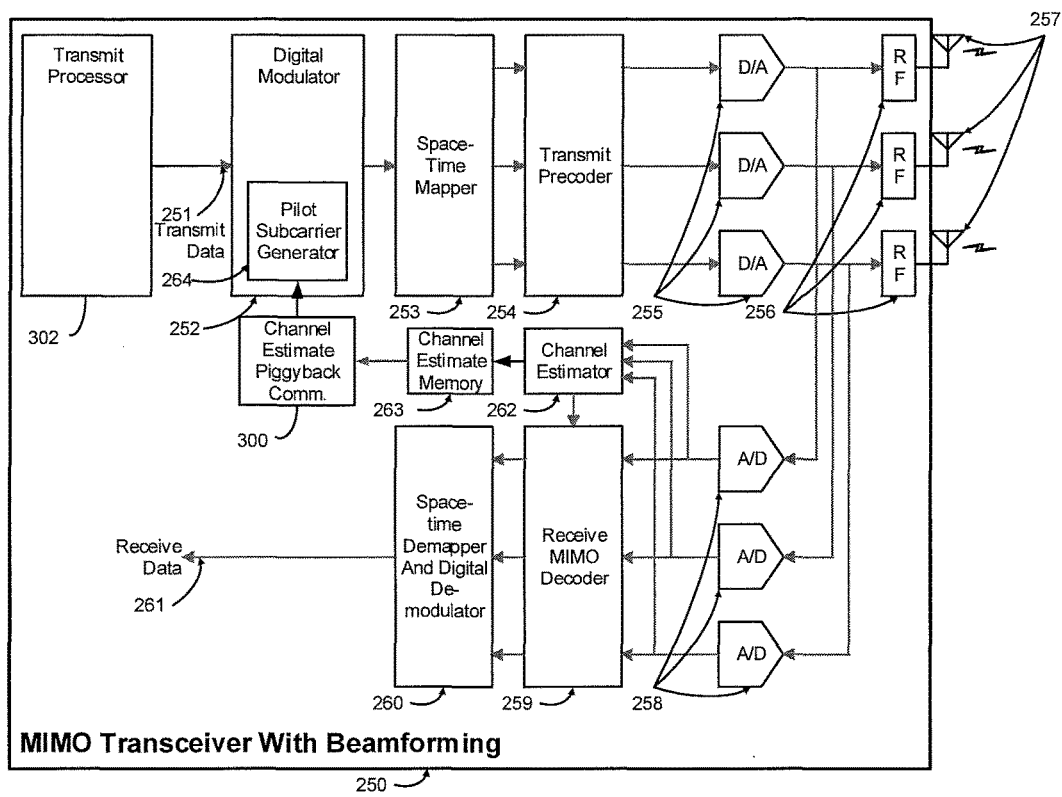
FIG. 12 shows a system for injecting CSI within unused portions of pilot subcarriers.

FIG. 12 represents a possible high-level block diagram of a mechanism for transmitting CSI calculated by a MIMO receiver during specific pilot symbol periods of frames transmitted by a MIMO transmitter. It should be understood that the diagram indicates three transmit and three receive streams (i.e., 3×3 MIMO) but may be applied to any number of MIMO streams. As illustrated, a MIMO transceiver 250 that may support beamforming exchanges involving CSI transfer may comprise a transmitter section accepting transmit data 251 and generating receive data 261. Transmit data 251 may be modulated by digital modulator 252, which may be an OFDM modulator. After the modulation process, MIMO space-time mapping may be performed by space-time mapper 253 to generate the parallel digital data streams. Beamforming may then be applied by transmit precoder 254, after which baseband processing and digital to analog (D/A) conversion is performed by D/A converters 255, and the analog signals may then be further processed by RF processing blocks 256 for steps including upconversion, filtering and amplification. The signals may be transmitted on antennas 257.

In the receive direction, signals received by antennas 257 may be processed (including amplification, downconversion, and filtering) by RF processing blocks 256, after which they may be converted to the digital domain and further processed at baseband by analog to digital (A/D) blocks 258. The parallel streams of digital data may be supplied to MIMO decoder 259, which may perform MIMO receive processing including equalization. The equalized receive signals may be passed to space-time demapper and digital demodulator 260, which may remove the space/time mapping and demodulates the signals to obtain a representation of the originally transmitted signal, as well as performing error correction.

The equalization parameters required by receive MIMO decoder 259 may be generated by channel estimator 262, which may accept the digitized data streams at baseband and perform a channel estimation process on fixed and well-known components of the incoming wireless data frame to obtain the coefficients of the RF channel matrix, calculate suitable equalization parameters, and provide them to receive MIMO decoder 259.

Channel estimator 262 may also calculate CSI and/or beamforming parameters and store them in channel estimate memory 264 for subsequent use by the remote transmitter. When a transmit frame is being generated from transmit data 251, a channel estimate piggyback communications module 300 may fetch the previously stored CSI and/or beamforming parameters from channel estimate memory 263 and pass them to pilot subcarrier generator 264 within digital modulator 252. Pilot subcarrier generator 264 may be operational to inject pilot symbols into the subcarriers generated by digital modulator 252. Pilot subcarrier generator 264 may, however, periodically interrupt the generation and injection of pilot symbols and substitute instead modulated symbols containing CSI and/or beamforming parameters provided by channel estimate piggyback communications module 300 from memory 263.

In operation, the receiver portion of MIMO transceiver 250 may be functional to receive MIMO OFDM signals representing an incoming receive frame, compute channel estimates, and store them in channel estimate memory 263. After the completion of the incoming receive frame, transmit data 251 may cause a frame to be transmitted in to the remote transmitter by MIMO transceiver 250. At this time channel estimates may be fetched by channel estimate piggyback communications module 300 from channel estimate memory 263, digitally modulated, and injected into the pilot subcarriers of the transmitted frame as CSI symbols by pilot subcarrier generator 264. The remote transmitter may then extract these CSI symbols and process them to obtain the channel estimates and/or beamforming parameters measured and computed by MIMO transceiver 250.

Although in FIG. 12, channel estimate piggyback communications module 300 provides the channel estimate to pilot subcarrier generator 264 for insertion in pilot subcarriers at the digital modulation phase, as indicated above, the channel estimate can be communicated to the MIMO transmitter in any suitable protocol data, management, or control frame without departing from the scope of the subject matter described herein. In addition, channel estimate piggyback communications module 300 may insert the channel estimate into the existing protocol data, management, or control frame during frame formation or after frame formation prior to, during, or after digital modulation.

Figure 13:
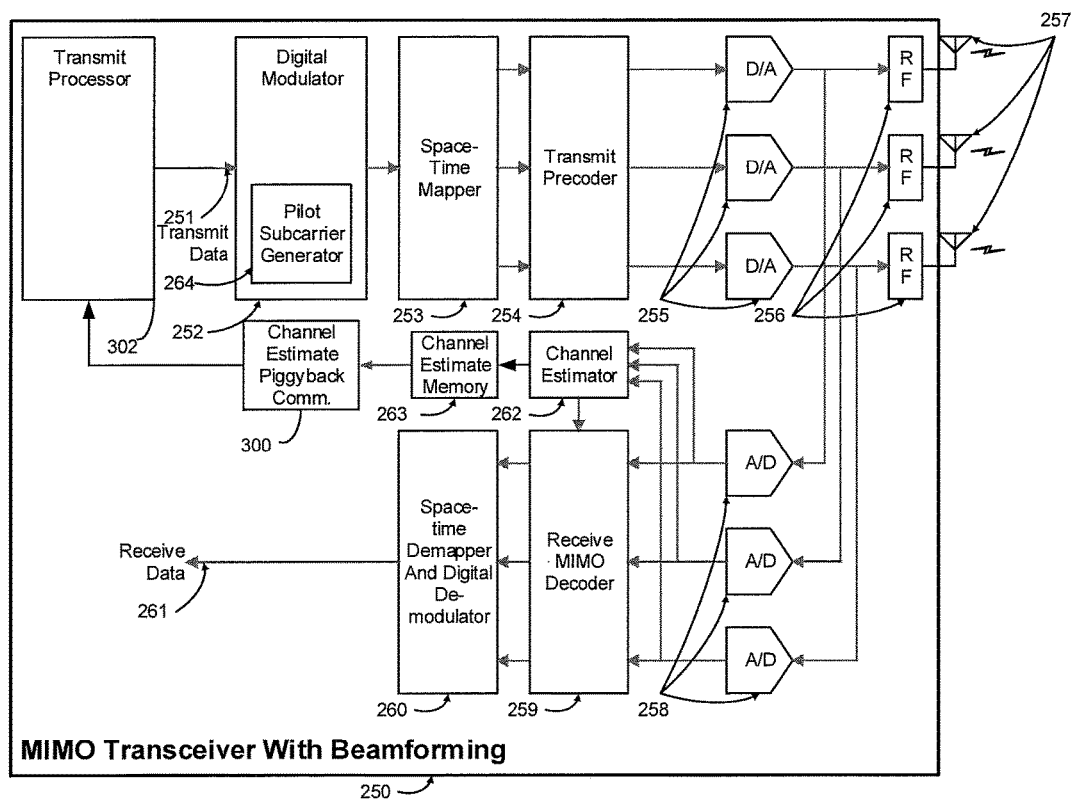
FIG. 13 shows a system for piggybacking CSI on existing protocol data exchanges.

FIG. 13 illustrates an example where channel estimate piggyback communications module 300 selects and inserts the channel estimate in an existing protocol data, management or control frame generated by transmit processor 302. In one example, channel estimator 262 may receive a channel estimation request from a remote station as part of a first protocol control frame and compute the channel estimate including channel parameters responsive to the channel estimation request, and channel estimate piggyback communications module 300 may select a second protocol control frame subsequently transmitted to the remote station and include the channel parameters in the second protocol control frame. The first protocol control frame and the second protocol control frame may perform protocol control functions unrelated to channel estimation. In one example, the first protocol control frame may be a data frame acknowledgement transmitted by the remote station, and the second protocol control frame may a data frame acknowledgement transmitted to the remote station, as illustrated above with respect to FIG. 4 or FIG. 6. In one example, the first protocol control frame is an IEEE 802.11 Request To Send frame, and said second protocol control frame is an IEEE 802.11 Clear To Send Frame, as illustrated in FIG. 6. In another example, the first protocol control frame is an IEEE 802.11 Beacon frame, and said second protocol control frame is an IEEE 802.11n Unsolicited Trigger Frame, as illustrated in FIG. 8. In yet another example, the first protocol control frame is an IEEE 802.11 Beacon frame, and the second protocol control frame is an IEEE 802.11n Power-Save Poll frame, as also illustrated in FIG. 8. In yet another example, the first protocol control frame may be an IEEE 802.11 Authentication Response frame, and the second protocol control frame may be an IEEE 802.11n Fast BSS Transition Request frame, as illustrated in FIG. 9.

In still another example, channel estimator 262 is configured to receive a channel estimation request from a remote station and to compute said channel estimate including channel parameters responsive to said channel estimation request. Channel estimation piggyback communications module 300 is configured to select a data or management frame subsequently transmitted to said remote station, include said channel parameters in said second data or management frame. Transmit processor 302 is configured to apply the channel parameters in transmission of a subsequent data or management frame, where the channel parameters are inserted into the Physical Layer Convergence Protocol header of said second data or management frame, as illustrated in FIG. 5.

In yet another example, channel estimator 262 is configured to receive a trigger frame transmitted by the first station at a plurality of second stations, the trigger frame containing a beamforming request from the first station and compute channel parameters within the plurality of second stations responsive to the beamforming request. Channel estimate piggyback communications module 300 is configured to select a corresponding plurality of data frames transmitted to the first station by the plurality of second stations and include the channel parameters into said plurality of transmitted data frames. The channel parameters computed by each one of the plurality of second stations is appended to each corresponding one of the plurality of data frames, as illustrated in FIG. 10.

In yet another example, channel estimator 262 is configured to periodically compute channel parameters for the wireless channel existing between said first and said second stations and channel estimate piggyback communications module 300 is configured to select a periodically transmitted management frame transmitted from said first station to said second station; and include said channel parameters in said periodically transmitted management frame, wherein said periodically transmitted management frame performs additional protocol control functions, as illustrated in FIG. 7. In one example, the periodically transmitted management frame is a Radio Resource Management frame, as also illustrated in FIG. 7.

Figure 14:
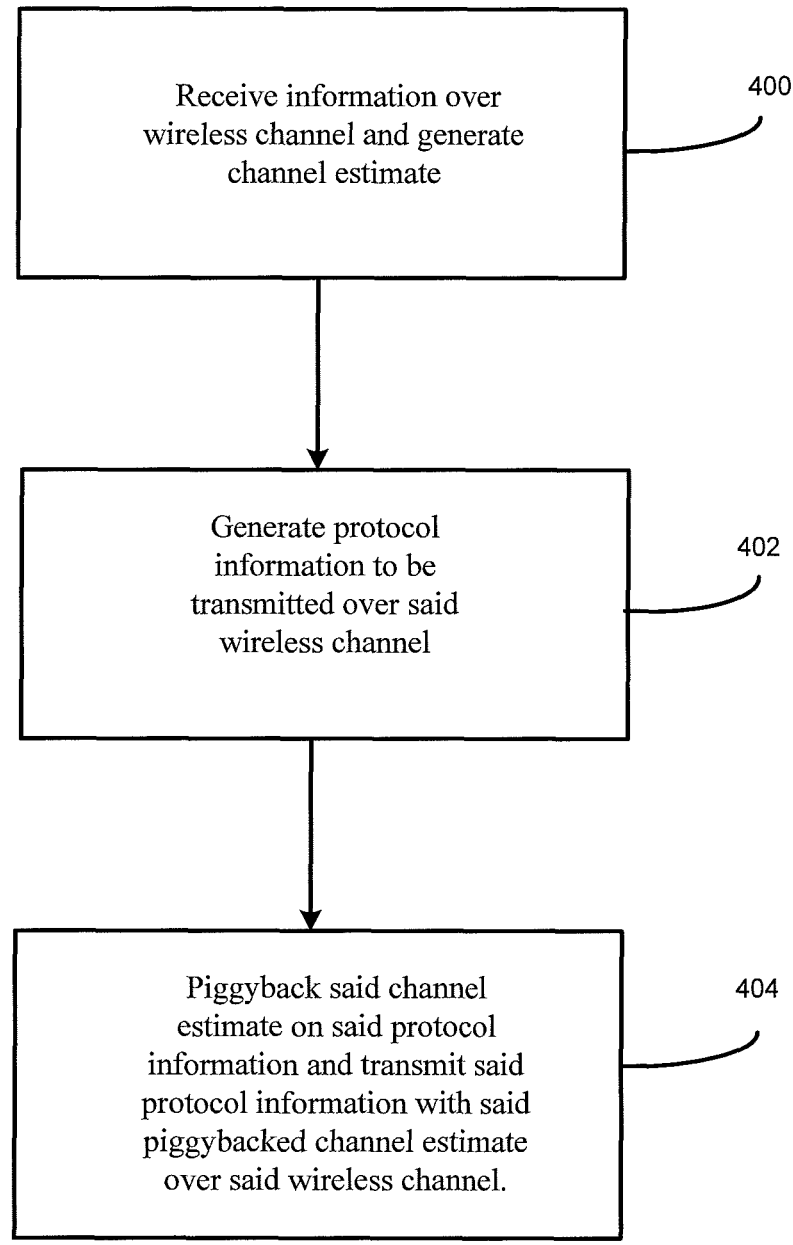
FIG. 14 shows a process for piggybacking CSI on existing protocol data exchanges.

FIG. 14 is a flow chart illustrating an exemplary process for transferring a wireless channel estimate according to an embodiment of the subject matter described herein. Referring to FIG. 14, in step 400, information is received over a wireless channel and a channel estimate is generated. The wireless channel may be an LTE wireless channel, an IEEE 802.11 wireless channel, or any other suitable wireless channel. The channel estimate may be generated by channel estimator 262 illustrated in FIG. 12 or 13 based on the information received over the wireless channel. In step 402, protocol information to be transmitted over said wireless channel is generated. The protocol information to be transmitted may be generated by transmit processor 302 illustrated in FIG. 13. The protocol information may be a data frame, a control frame, a management frame, or any other suitable type of frame. In step 404, the channel estimate is piggybacked on the protocol information and the protocol information with the piggybacked channel estimate is transmitted over the wireless channel. The channel estimate may be piggybacked on an existing protocol exchange by channel estimate piggyback communications module 300 illustrated in FIG. 13 using any of the methods described above with respect to FIGS. 4-13.

It will be apparent to those of ordinary skill in the art that the embodiments and aspects described herein may be applicable to a number of wireless communications protocols, including but not limited to the IEEE 802.11 WLAN protocol, as well as the Long Term Evolution (LTE) protocol. It will further be appreciated that, in accordance with certain teachings herein, these aspects and embodiments may be applicable to a number of wireless communication technologies, such as OFDM, MIMO, and MU-MIMO. A wireless communication protocol that involves the exchange of channel state information, beamforming parameters, equalization parameters, or measurements of RF channel conditions and parameters may benefit from one or more of the embodiments and aspects covered herein.

It will be appreciated that, in accordance with certain embodiments described herein, the efficiency and rapidity of communicating and exchanging channel estimates and corresponding beamforming or equalization matrices may be substantially improved. Further, certain aspects described herein may consume less available channel capacity in order to transfer such estimates or beamforming data. Yet further, certain embodiments described herein may enable the transfer of such estimates or data without additional overhead by re-using existing protocol elements or functions. Advantageously, this may significantly increase the available channel capacity for transferring payload data, reduce the number of lost frames due to low SNR, and permit more frequent beamforming exchanges to obtain more accurate and timely CSI.

It will also be appreciated that, in accordance with aspects of certain embodiments described herein, the rate at which CSI is calculated and exchanged may be increased. Further, certain aspects of these embodiments may permit beamforming exchanges to be performed simultaneously with handover or roaming protocol functions, such as Fast BSS Transition functions. Advantageously, this may permit an improved ability to cope with mobile devices.

It will further be appreciated that, in accordance with certain aspects described herein, beamforming exchanges may be performed concurrently with power-save protocol functions. For instance, such exchanges may be efficiently conducted as part of a device wake-up procedure. Advantageously, this may enable the reduction of power consumption and consequently an increased battery life for battery-powered devices, and may further allow lower-loss data transfers for devices conserving power.

Accordingly, while the subject matter herein has been described with reference to illustrative embodiments, this description is not intended to be construed in a limiting sense. Various modifications of the illustrative embodiments, as well as other aspects or embodiments of the subject matter described herein, will be apparent to persons of ordinary skill in the art upon reference to this description. These modifications shall not be construed as departing from the scope of the subject matter described herein, which is defined solely by the claims appended hereto.

What is claimed is:

1. A system for transferring a channel estimate for wireless digital communications, comprising:
   a channel estimator for receiving information over a wireless channel and generating a channel estimate;
   a transmit processor for generating protocol information to be transmitted over said wireless channel;
   a channel estimate piggyback communications module for piggybacking said channel estimate on said protocol information and transmitting said protocol information with said piggybacked channel estimate over said wireless channel; and
   a pilot subcarrier generator operatively coupled to said transmit processor for inserting pilot data within said protocol information transmitted over said wireless channel, wherein said channel estimate piggyback communications module provides said channel estimate to said pilot subcarrier generator, which encodes said channel estimate into said pilot data.

2. The system of claim 1 comprising a channel estimate memory for storing said channel estimate, wherein said channel estimate piggyback communications module is operatively coupled to said channel estimate memory.

3. The system of claim 1 wherein said encoding of said channel estimate into said pilot data is performed at intervals.

4. A system for transferring a channel estimate for wireless digital communications, comprising:
   a channel estimator for receiving information over a wireless channel and generating a channel estimate;
   a transmit processor for generating protocol information to be transmitted over said wireless channel; and
   a channel estimate piggyback communications module for piggybacking said channel estimate on said protocol information and transmitting said protocol information with said piggybacked channel estimate over said wireless channel, wherein:
   said channel estimator is configured to receive a channel estimation request from a remote station as part of a first protocol control frame and compute said channel estimate including channel parameters responsive to said channel estimation request;
   said channel estimate piggyback communications module is configured to select a second protocol control frame subsequently transmitted to said remote station; and include said channel parameters in said second protocol control frame;

said first protocol control frame and said second protocol control frame perform protocol control functions unrelated to channel estimation; and said first protocol control frame is an IEEE 802.11 Beacon frame, and said second protocol control frame is an IEEE 802.11n Unsolicited Trigger Frame.

5. A system for transferring a channel estimate for wireless digital communications, comprising:

a channel estimator for receiving information over a wireless channel and generating a channel estimate;

a transmit processor for generating protocol information to be transmitted over said wireless channel; and a channel estimate piggyback communications module for piggybacking said channel estimate on said protocol information and transmitting said protocol information with said piggybacked channel estimate over said wireless channel, wherein:

said channel estimator is configured to receive a channel estimation request from a remote station as part of a first protocol control frame and compute said channel estimate including channel parameters responsive to said channel estimation request;

said channel estimate piggyback communications module is configured to select a second protocol control frame subsequently transmitted to said remote station; and include said channel parameters in said second protocol control frame;

said first protocol control frame and said second protocol control frame perform protocol control functions unrelated to channel estimation; and said first protocol control frame is an IEEE 802.11 Beacon frame, and said second protocol control frame is an IEEE 802.11n Power-Save Poll frame.

6. A system for transferring a channel estimate for wireless digital communications, comprising:

a channel estimator for receiving information over a wireless channel and generating a channel estimate;

a transmit processor for generating protocol information to be transmitted over said wireless channel; and a channel estimate piggyback communications module for piggybacking said channel estimate on said protocol information and transmitting said protocol information with said piggybacked channel estimate over said wireless channel, wherein:

said channel estimator is configured to receive a channel estimation request from a remote station as part of a first protocol control frame and compute said channel estimate including channel parameters responsive to said channel estimation request;

said channel estimate piggyback communications module is configured to select a second protocol control frame subsequently transmitted to said remote station; and include said channel parameters in said second protocol control frame;

said first protocol control frame and said second protocol control frame perform protocol control functions unrelated to channel estimation; and said first protocol control frame is an IEEE 802.11 Authentication Response frame, and said second protocol control frame is an IEEE 802.11n Fast BSS Transition Request frame.

7. A system for transferring a channel estimate for wireless digital communications, comprising:

a channel estimator for receiving information over a wireless channel and generating a channel estimate;

a transmit processor for generating protocol information to be transmitted over said wireless channel;

a channel estimate piggyback communications module for piggybacking said channel estimate on said protocol information and transmitting said protocol information with said piggybacked channel estimate over said wireless channel, wherein:

said channel estimator is configured to receive a channel estimation request from a remote station and to compute said channel estimate including channel parameters responsive to said channel estimation request;

said channel estimation piggyback communications module is configured to select a data or management frame to be transmitted to said remote station and include said channel parameters in said data or management frame;

said transmit processor is configured to apply said channel parameters in transmitting said data or management frame; and said channel parameters are inserted into the Physical Layer Convergence Protocol header of said data or management frame.

8. A system for transferring a channel estimate for wireless digital communications, comprising:

a channel estimator for receiving information over a wireless channel and generating a channel estimate;

a transmit processor for generating protocol information to be transmitted over said wireless channel;

a channel estimate piggyback communications module for piggybacking said channel estimate on said protocol information and transmitting said protocol information with said piggybacked channel estimate over said wireless channel; and a first station for transmitting a trigger frame including a beamforming request and a plurality of second stations for receiving the trigger frame containing the beamforming request, each of the second stations including said channel estimator and said channel estimate piggyback communications module, wherein said channel estimators at said second stations are configured to compute channel parameters within said plurality of second stations responsive to said beamforming request; and wherein said channel estimate piggyback communications modules are configured to select a corresponding plurality of data frames to be transmitted to said first station by said plurality of second stations and include said channel parameters in said plurality of data frames, wherein said channel parameters computed by each of said plurality of second stations is appended to each corresponding one of said plurality of data frames.

9. A system for transferring a channel estimate for wireless digital communications, comprising:

a channel estimator for receiving information over a wireless channel and generating a channel estimate;

a transmit processor for generating protocol information to be transmitted over said wireless channel; and a channel estimate piggyback communications module for piggybacking said channel estimate on said protocol information and transmitting said protocol information with said piggybacked channel estimate over said wireless channel;

a first station and a plurality of second stations, wherein said second stations each include said channel estimator, said transmit protocol processor, and said channel estimate piggyback communications module;

wherein said channel estimators are configured to periodically compute channel parameters for the wireless channel existing between said first and said second stations, and wherein said channel estimate piggyback communications modules are configured to select a management frame to be periodically transmitted from said second stations to said first station and include said channel parameters in said periodically transmitted management frame, wherein said periodically transmitted management frame performs additional protocol control functions and wherein said periodically transmitted management frame is a Radio Resource Management frame.

10. A method for transferring a channel estimate for wireless digital communications, comprising:
receiving information over a wireless channel and generating a channel estimate;
generating protocol information to be transmitted over said wireless channel;
piggybacking said channel estimate on said protocol information and transmitting said protocol information with said piggybacked channel estimate over said wireless channel; and
inserting pilot data within said information transmitted over said wireless channel, wherein piggybacking said channel estimate on said protocol information includes providing said channel estimate to said pilot subcarrier generator, which encodes said channel estimate in said pilot data.

11. The method of claim 10 comprising storing said channel estimate in a channel estimate memory.

12. The method of claim 10 wherein said encoding of said channel estimate in said pilot data is performed at intervals.

13. A method for transferring a channel estimate for wireless digital communications, comprising:
receiving information over a wireless channel and generating a channel estimate;
generating protocol information to be transmitted over said wireless channel;
piggybacking said channel estimate on said protocol information and transmitting said protocol information with said piggybacked channel estimate over said wireless channel;
receiving a channel estimation request from a remote station as part of a first protocol control frame, computing said channel estimate including channel parameters responsive to said channel estimation request, selecting a second protocol control frame subsequently transmitted to said remote station, and including said channel parameters in said second protocol control frame, wherein said first protocol control frame and said second protocol control frame perform protocol control functions unrelated to channel estimation; and
wherein said first protocol control frame is a data frame acknowledgement transmitted by said remote station, and said second protocol control frame is a data frame acknowledgement transmitted to said remote station.

14. A method for transferring a channel estimate for wireless digital communications, comprising:
receiving information over a wireless channel and generating a channel estimate;
generating protocol information to be transmitted over said wireless channel;
piggybacking said channel estimate on said protocol information and transmitting said protocol information with said piggybacked channel estimate over said wireless channel;
receiving a channel estimation request from a remote station as part of a first protocol control frame, computing said channel estimate including channel parameters responsive to said channel estimation request, selecting a second protocol control frame subsequently transmitted to said remote station, and including said channel parameters in said second protocol control frame, wherein said first protocol control frame and said second protocol control frame perform protocol control functions unrelated to channel estimation; and
wherein said first protocol control frame is an IEEE 802.11 Beacon frame, and said second protocol control frame is an IEEE 802.11n Unsolicited Trigger Frame.

15. A method for transferring a channel estimate for wireless digital communications, comprising:
receiving information over a wireless channel and generating a channel estimate;
generating protocol information to be transmitted over said wireless channel;
piggybacking said channel estimate on said protocol information and transmitting said protocol information with said piggybacked channel estimate over said wireless channel;
receiving a channel estimation request from a remote station as part of a first protocol control frame, computing said channel estimate including channel parameters responsive to said channel estimation request, selecting a second protocol control frame subsequently transmitted to said remote station, and including said channel parameters in said second protocol control frame, wherein said first protocol control frame and said second protocol control frame perform protocol control functions unrelated to channel estimation; and
wherein said first protocol control frame is an IEEE 802.11 Beacon frame, and said second protocol control frame is an IEEE 802.11n Power-Save Poll frame.

16. A method for transferring a channel estimate for wireless digital communications, comprising:
receiving information over a wireless channel and generating a channel estimate;
generating protocol information to be transmitted over said wireless channel;
piggybacking said channel estimate on said protocol information and transmitting said protocol information with said piggybacked channel estimate over said wireless channel;
receiving a channel estimation request from a remote station as part of a first protocol control frame, computing said channel estimate including channel parameters responsive to said channel estimation request, selecting a second protocol control frame subsequently transmitted to said remote station, and including said channel parameters in said second protocol control frame, wherein said first protocol control frame and said second protocol control frame perform protocol control functions unrelated to channel estimation; and
wherein said first protocol control frame is an IEEE 802.11 Authentication Response frame, and said second protocol control frame is an IEEE 802.11n Fast BSS Transition Request frame.

17. A method for transferring a channel estimate for wireless digital communications, comprising:
receiving information over a wireless channel and generating a channel estimate;
generating protocol information to be transmitted over said wireless channel;

piggybacking said channel estimate on said protocol information and transmitting said protocol information with said piggybacked channel estimate over said wireless channel;

receiving a channel estimation request from a remote station and computing said channel estimate including channel parameters responsive to said channel estimation request;

selecting a data or management frame to be transmitted to said remote station; including said channel parameters in said data or management frame; and applying said channel parameters in transmission of a subsequent data or management frame, wherein said channel parameters are inserted into the Physical Layer Convergence Protocol header of said data or management frame.

18. A method for transferring a channel estimate for wireless digital communications, comprising:

receiving information over a wireless channel and generating a channel estimate;

generating protocol information to be transmitted over said wireless channel;

piggybacking said channel estimate on said protocol information and transmitting said protocol information with said piggybacked channel estimate over said wireless channel; and receiving a beamforming request from a first station at a plurality of second stations, computing channel parameters within said plurality of second stations responsive to said beamforming request, selecting a corresponding plurality of data frames to be transmitted to said first station by said plurality of second stations, and including said channel parameters in said plurality of data frames, wherein said channel parameters computed by each of said plurality of second stations are appended to each corresponding one of said plurality of data frames.

19. A method for transferring a channel estimate for wireless digital communications, comprising:

receiving information over a wireless channel and generating a channel estimate;

generating protocol information to be transmitted over said wireless channel;

piggybacking said channel estimate on said protocol information and transmitting said protocol information with said piggybacked channel estimate over said wireless channel;

periodically computing channel parameters for the wireless channel existing between a first and a plurality of second stations; selecting a periodically transmitted management frame transmitted from said second stations to said first station; and including said channel parameters in said periodically transmitted management frame, wherein said periodically transmitted management frame performs additional protocol control functions; and wherein said periodically transmitted management frame is a Radio Resource Management frame.

20. A non-transitory computer readable medium having stored thereon executable instructions that when executed by a processor of a computer control the computer to perform steps comprising:

receiving information over a wireless channel and generating a channel estimate;

generating protocol information to be transmitted over said wireless channel;

piggybacking said channel estimate on said protocol information and transmitting said protocol information with said piggybacked channel estimate over said wireless channel; and inserting pilot data within said information transmitted over said wireless channel, wherein piggybacking said channel estimate on said protocol information includes providing said channel estimate to said pilot subcarrier generator, which encodes said channel estimate in said pilot data.

* * * * *